United States Patent
Zhao et al.

(10) Patent No.: US 12,120,047 B2
(45) Date of Patent: Oct. 15, 2024

(54) SIDELINK CHANNEL CONFIGURATION METHOD, TERMINAL DEVICE, AND NETWORK DEVICE

(71) Applicant: GUANGDONG OPPO MOBILE TELECOMMUNICATIONS CORP., LTD., Dongguan (CN)

(72) Inventors: Zhenshan Zhao, Dongguan (CN); Qianxi Lu, Dongguan (CN); Huei-Ming Lin, Victoria (AU)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 487 days.

(21) Appl. No.: 17/170,863

(22) Filed: Feb. 8, 2021

(65) Prior Publication Data
US 2021/0167917 A1    Jun. 3, 2021

Related U.S. Application Data

(63) Continuation of application No. PCT/CN2018/108083, filed on Sep. 27, 2018.

(30) Foreign Application Priority Data

Aug. 10, 2018    (WO) ................ PCT/CN2018/099846

(51) Int. Cl.
*H04W 74/08*    (2024.01)
*H04B 7/04*    (2017.01)
(Continued)

(52) U.S. Cl.
CPC ........ *H04L 5/0048* (2013.01); *H04L 41/0803* (2013.01); *H04W 4/40* (2018.02); *H04W 72/0446* (2013.01)

(58) Field of Classification Search
CPC . H04L 27/2613; H04L 27/261; H04L 5/0044; H04L 41/0806; H04L 41/0816;
(Continued)

(56) References Cited

U.S. PATENT DOCUMENTS

| 2015/0155993 A1* | 6/2015 | Berggren | H04L 5/0023 370/330 |
| 2015/0245383 A1* | 8/2015 | Seo | H04L 5/0032 370/336 |

(Continued)

FOREIGN PATENT DOCUMENTS

| CN | 106470492 A | 3/2017 |
| CN | 107666452 A | 2/2018 |

(Continued)

OTHER PUBLICATIONS

First Office Action issued in corresponding Chinese application No. 202110312895.2, mailed Jul. 25, 2022.
(Continued)

*Primary Examiner* — Edan Orgad
*Assistant Examiner* — Vanneilian Lalchinthang
(74) *Attorney, Agent, or Firm* — BAYES PLLC

(57) ABSTRACT

Embodiments of the present disclosure provide a sidelink channel configuration method, a terminal device, and a network device. The method includes determining, in a terminal device, that a second time domain symbol in a first sidelink channel is a first Demodulation Reference Signal (DMRS) time domain symbol, and a difference in symbol locations of two adjacent DMRS time domain symbols is N. The first sidelink channel occupies K time domain symbols, and K is a positive integer, where $1 \leq N < K$.

14 Claims, 7 Drawing Sheets

(51) Int. Cl.
   *H04L 5/00* (2006.01)
   *H04L 41/0803* (2022.01)
   *H04W 4/40* (2018.01)
   *H04W 72/0446* (2023.01)

(58) Field of Classification Search
   CPC ... H04L 5/0078; H04L 5/0094; H04L 5/0051; H04L 5/0048; H04L 41/0803; H04W 72/20; H04W 74/0816; H04W 56/0035; H04W 4/40; H04W 4/46; H04W 72/0446; H04W 76/14; H04W 92/18; H04B 17/345; H04J 2211/005
   USPC .......................................................... 370/254
   See application file for complete search history.

(56) References Cited

U.S. PATENT DOCUMENTS

| | | | |
|---|---|---|---|
| 2015/0271831 A1* | 9/2015 | Wang | H04J 11/0036 370/329 |
| 2016/0095092 A1 | 3/2016 | Khoryaev et al. | |
| 2016/0227521 A1* | 8/2016 | Han | H04W 72/0453 |
| 2016/0270059 A1* | 9/2016 | Chen | H04L 5/0051 |
| 2017/0094657 A1* | 3/2017 | Yoon | H04L 5/0012 |
| 2017/0188391 A1* | 6/2017 | Rajagopal | H04W 74/0816 |
| 2018/0048446 A1 | 2/2018 | Jiang et al. | |
| 2018/0212733 A1* | 7/2018 | Khoryaev | H04W 56/0035 |
| 2021/0119843 A1* | 4/2021 | Zhang | H04L 27/2613 |
| 2021/0143962 A1* | 5/2021 | Jiang | H04L 5/0051 |
| 2021/0266895 A1* | 8/2021 | Wang | H04L 5/0007 |

FOREIGN PATENT DOCUMENTS

| | | |
|---|---|---|
| CN | 107689857 A | 2/2018 |
| CN | 107733818 A | 2/2018 |
| CN | 107925533 A | 4/2018 |
| CN | 108353063 A | 7/2018 |
| JP | 2015095669 A | 5/2015 |
| TW | 737844 B | 9/2021 |
| TW | I737844 B | 9/2021 |
| WO | 2017026975 A1 | 2/2017 |
| WO | 2017052489 A1 | 3/2017 |
| WO | 2017/171895 A1 | 10/2017 |
| WO | 2017176097 A1 | 10/2017 |
| WO | 2018038978 A1 | 3/2018 |
| WO | 2020029225 A1 | 2/2020 |
| WO | 2020029403 A1 | 2/2020 |

OTHER PUBLICATIONS

First Office Action issued in corresponding Japanese application No. 2021-507030, mailed Sep. 2, 2022.
Intel Corporation, "Remaining details of PSCCH and PSSCH physical layer structure for V2V communication", R1-166509, 3GPP TSG RAN WG1 Meeting #86 Gothenburg, Sweden, Aug. 22026, 2016.
First Office action issued in corresponding India Application No. 202127008583, mailed Jan. 20, 2022, 6 pages.
First Office action issued in corresponding European Application No. 18929825.0, mailed Apr. 11, 2022, 8 pages.
"Discussion on DMRS enhancement and operation for V2V", Agenda Item: 7.3.2.2.1, Source: Sony, 3GPP TSG RAN WG1 Meeting #84, R1-160677, St Julian's, Malta, Feb. 15-19, 2016, 3 pages.
Second Office Action issued in corresponding Chinese application No. 202110312895.2, mailed Oct. 28, 2022.
First Office Action issued in corresponding Taiwanese application No. 108128380, mailed Oct. 7, 2022.
Summons to attend Oral Proceedings issued in corresponding European application No. 18929825.0, mailed Nov. 18, 2022.
Ericsson, "DMRS placement configurations", R1-1609770, 3GPP TSG-RAN WG1 #86bis Lisbon, Portugal, Oct. 10-14, 2016.
Intel Corporation, "On DMRS physical structure enhancements for PSCCH and PSSCH", R1-162362, 3GPP TSG RAN WG1 Meeting #84bis Busan, South Korea, Apr. 11-15, 2016.
Notice of Allowance issued in corresponding Chinese application No. 202110312895.2, mailed Jan. 19, 2023.
Second Office Action issued in corresponding Japanese application No. 2021-507030, mailed Mar. 10, 2023.
Second Office Action issued in corresponding Taiwanese application No. 108128380, mailed Feb. 16, 2023.
Extended European Search Report issued in corresponding European Applicatino No. 18929825.0, mailed Jul. 28, 2021, 10 pages.
"DMRS configuration for PSSCH and PSCCH", Agenda Item: 6.2.2.1.1, Source: Samsung, 3GPP TSG RAN WG1 Meeting #85, R1-164754, Nanjing, May 23-27, 2016, 3 pages.
"Resource pool configurations on LTE sidelink for V2V services", Agenda Item: 7.3.2.2.2, Source: Sony, 3GPP TSG RAN WG1 Meeting #84, R1-160679, St Julian's, Malta, Feb. 15-19, 2016, 3 pages.
Liu, Guangyi et al., "Further Vision on TD-SCDMA Evolution", 2005 Asia-Pacific Conference on Communications, Perth, Western Australia, Oct. 3-5, 2005, 5 pages.
PCT Written Opinion of The International Searching Authority issued in corresponding International Application No. PCT/CN2018/099846, mailed on Apr. 8, 2019, 9 pages.
PCT Written Opinion of The International Searching Authority issued in corresponding International Application No. PCT/CN2018/108083, mailed on May 7, 2019, 7 pages.
"Remaining details on DMRS for PSCCH and PSSCH", Agenda Item: 7.2.2.1, Source: LG Electronics, 3GPP TSG RAN WG1 Meeting #86, R1-166821, Gothenburg, Sweden, Aug. 22-26, 2016, 3 pages.
Brief communication (Oral proceedings) issued in corresponding European application No. 18929825.0, mailed Apr. 24, 2023.
Consultation by telephone_in person issued in corresponding European application No. 18929825.0, mailed Apr. 24, 2023.
EPO Minutes of Oral Proceedings issued in corresponding European application No. 18929825.0, mailed May 11, 2023.
Decision to refuse a European Patent application issued in corresponding European application No. 18929825.0, mailed May 30, 2023.
Notice of Allowance issued in corresponding Taiwanese application No. 108128380, mailed Jul. 24, 2023.
Notice of Allowance issued in corresponding Japanese application No. 2021-507030, mailed Aug. 4, 2023.
Extended European Search Report issued in corresponding European application No. 23180463.4, mailed Sep. 26, 2023.
First Office Action issued in corresponding Australian application No. 2018435590, mailed Apr. 29, 2024.
Hearing Notice issued in corresponding Indian application No. 202127008583, mailed May 28, 2024.
First Office Action issued in corresponding Korean application No. 10-2021-7005078, mailed Jun. 21, 2024.
Source: Intel Corporation; Title: Sidelink DMRS enhancements for V2V communication 3GPP TSG RAN WG1 Meeting #84 R1-160430 St Julian's, Malta, Feb. 15-19, 2016.
Source: Sony; Title: Discussion on DMRS enhancement and operation for V2V 3GPP TSG RAN WG1 Meeting #84bis R1-162559 Busan, Korea Apr. 11-15, 2016.
Second Hearing Notice issued in corresponding Indian Application No. 202127008583, dated Aug. 12, 2024. 3 pages.

* cited by examiner

SIDELINK CHANNEL CONFIGURATION METHOD, TERMINAL DEVICE, AND NETWORK DEVICE

CROSS-REFERENCE TO RELATED APPLICATIONS

The present application is a continuation of International Application No. PCT/CN2018/108083, filed on Sep. 27, 2018, entitled "SIDELINK CHANNEL CONFIGURATION METHOD, TERMINAL DEVICE, AND NETWORK DEVICE," which claims the benefit of priority to International Application No. PCT/CN2018/099846, filed on Aug. 10, 2018, entitled "SIDELINK CHANNEL CONFIGURATION METHOD, TERMINAL DEVICE AND NETWORK DEVICE," both of which are incorporated herein by reference in their entireties.

BACKGROUND

Embodiments of the present disclosure generally relate to communication technologies, and more particularly, to sidelink channel configuration methods, terminal devices, and network devices.

In the Vehicle to Everything (V2X) based on the Long-Term Evolution (LTE) system, the Physical Sidelink Control Channel (PSCCH) and the Physical Sidelink Shared Channel (PSSCH) have the same Demodulation Reference Signal (DMRS) format, and four DMRS time domain symbols are included in a subframe (the positions of the four DMRS time domain symbols are the 3rd, 6th, 9th, and 12th symbols). In V2X based on the New Radio (NR) system, higher requirements are placed on data interaction between vehicles, such as higher throughput, lower delay, higher reliability, greater coverage, more flexible resource allocation, etc. Therefore, the DMRS formats for PSCCH and PSSCH need to be adjusted to meet the requirements for data interaction in NR-based V2X.

SUMMARY

Embodiments of the present disclosure provide a sidelink channel configuration method, a terminal device, and a network device, which can flexibly configure the DMRS for the PSCCH and the DMRS for the PSSCH to make the DMRSs each occupies a part of time domain symbols in one subframe, thereby meeting the requirements for data interaction in NR-based V2X.

According to a first aspect, there is provided a sidelink channel configuration method, including determining, in a terminal device, that a second time domain symbol in a first sidelink channel is a DMRS time domain symbol, and there are N time domain symbols between two adjacent DMRS time domain symbols, wherein the first sidelink channel occupies K time domain symbols, and K is a positive integer, $1 \leq N < K$.

According to embodiments, the first sidelink channel is PSCCH or PSSCH.

According to a second aspect, there is provided a sidelink channel configuration method, including sending, in a network device, first configuration information to a terminal device, wherein the first configuration information is used to indicate that a second time domain symbol in a first sidelink channel is a first DMRS time domain symbol, there are N time domain symbols between two adjacent DMRS time domain symbols, and the first sidelink channel occupies K time domain symbols, and K is a positive integer, $1 \leq N < K$.

According to embodiments, the first sidelink channel is PSCCH or PSSCH.

According to a third aspect, there is provided a sidelink channel configuration method, including determining, in a terminal device, that a first time domain symbol in a first sidelink channel is a first DMRS time domain symbol, there are P subcarriers between two adjacent DMRS signals in any Physical Resource Block (PRB) on the first DMRS time domain symbol, P is an integer satisfying $2 \leq P < N\_sc$, and $N\_sc$ represents an amount of subcarriers included in one PRB.

According to a fourth aspect, there is provided a sidelink channel configuration method, including sending, in a network device, first configuration information to a terminal device, wherein the first configuration information is used to indicate that a first time domain symbol in a first sidelink channel is a first DMRS time domain symbol, there are P subcarriers between two adjacent DMRS signals in any PRB on the first DMRS time domain symbol, P is an integer satisfying $2 \leq P < N\_sc$, and $N\_sc$ represents an amount of subcarriers included in one PRB.

According to a fifth aspect, there is provided a terminal device configured to perform the method according to the first aspect or any one of implementations of the first aspect.

According to embodiments, the terminal device includes functional modules configured to perform the method according to the first aspect or any one of implementations of the first aspect.

According to a sixth aspect, there is provided a network device configured to perform the method according to the second aspect or any one of implementations of the second aspect.

According to embodiments, the network device includes functional modules configured to perform the method according to the second aspect or any one of implementations of the second aspect.

According to a seventh aspect, there is provided a terminal device configured to perform the method according to the third aspect or any one of implementations of the third aspect.

According to embodiments, the terminal device includes functional modules configured to perform the method according to the third aspect or any one of implementations of the third aspect.

According to an eighth aspect, there is provided a network device configured to perform the method according to the fourth aspect or any one of implementations of the fourth aspect.

According to embodiments, the network device includes functional modules configured to perform the method according to the fourth aspect or any one of implementations of the fourth aspect.

According to a ninth aspect, there is provided a terminal device, including a processor and a memory. The memory is configured to store a computer program, and the processor is configured to call and run the computer program stored in the memory to cause the terminal device to perform the method according to the first aspect or any one of implementations of the first aspect.

According to a tenth aspect, there is provided a network device, including a processor and a memory. The memory is configured to store a computer program, and the processor is configured to call and run the computer program stored in the memory to cause the network device to perform the method according to the second aspect or any one of implementations of the second aspect.

According to an eleventh aspect, there is provided a terminal device, including a processor and a memory. The memory is configured to store a computer program, and the processor is configured to call and run the computer program stored in the memory to cause the terminal device to perform the method according to the third aspect or any one of implementations of the third aspect.

According to a twelfth aspect, there is provided a network device, including a processor and a memory. The memory is configured to store a computer program, and the processor is configured to call and run the computer program stored in the memory to cause the network device to perform the method according to the fourth aspect or any one of implementations of the fourth aspect.

According to a thirteenth aspect, there is provided a chip configured to perform the method according to any one of the first to fourth aspects or any one of the implementations of the first to fourth aspects.

According to embodiments, the chip includes a processor configured to call and run a computer program from a memory to cause a device in which the chip is installed to perform the method according to any one of the first to fourth aspects or any one of the implementations of the first to fourth aspects.

According to a fourteenth aspect, there is provided a computer-readable storage medium configured to store a computer program that causes a computer to perform the method according to any one of the first to fourth aspects or any one of the implementations of the first to fourth aspects.

According to a fifteenth aspect, there is provided a computer program product including computer program instructions that cause a computer to perform the method the method according to any one of the first to fourth aspects or any one of the implementations of the first to fourth aspects.

According to a sixteenth aspect, there is provided a computer program. When the computer program is run on a computer, the computer is caused to perform the method according to any one of the first to fourth aspects or any one of the implementations of the first to fourth aspects.

In the technical solutions according to the first and second aspects, the terminal device can determine that the second time domain symbol in the first sidelink channel that occupies K time domain symbols is the first DMRS time domain symbol, and there are N time domain symbols between two adjacent DMRS time domain symbols. Thus, it can be flexibly configured that the DMRS for the first sidelink channel occupies a part of the K time domain symbols, thereby meeting the requirements for data interaction in NR-based V2X.

In the technical solutions according to the third and fourth aspects, the terminal device can determine that the first time domain symbol in the first sidelink channel that occupies K time domain symbols is the first DMRS time domain symbol, and there are P subcarriers between two adjacent DMRS signals in any Physical Resource Block (PRB) on the first DMRS time domain symbol. Thus, it can be flexibly configured that the DMRS for the first sidelink channel occupies a part of the K time domain symbols, thereby meeting the requirements for data interaction in NR-based V2X.

DETAILED DESCRIPTION

Technical solutions in embodiments of the present disclosure will be described below with reference to drawings. It is apparent that the described embodiments are a part of the embodiments of the present disclosure, not all of the embodiments. Based on the embodiments described herein, all other embodiments obtained by those of ordinary skill in the art without creative work shall fall within the protection scope of the present disclosure.

It should be understood that the technical solutions in the embodiments of the present disclosure may be applied to a Device to Device (D2D) communication system, for example, Internet of Vehicles that performs D2D communications based on Long Term Evolution (LTE). Unlike the traditional LTE system in which communication data between terminals is received or sent through network devices (for example, base stations), the Internet of Vehicles system uses terminal-to-terminal direct communication, and thus the Internet of Vehicles system has higher spectrum efficiency and lower transmission delay.

According to embodiments, the communication system which the Internet of Vehicles system is based on may be a Global System of Mobile Communication (GSM) system, a Code Division Multiple Access (CDMA) system, a Wideband Code Division Multiple Access (WCDMA) system, a General Packet Radio Service (GPRS) system, a LTE system, a LTE Frequency Division Duplex (FDD) system, a LTE Time Division Duplex (TDD) system, a Universal Mobile Telecommunication System (UMTS), a Worldwide Interoperability for Microwave Access (WiMAX) communication system, a 5G New Radio (NR) system, etc.

The terminal device in embodiments of the present disclosure may be a terminal device capable of implementing D2D communication. For example, the terminal device may be a vehicle-mounted terminal device, a terminal device in a 5G network, or a terminal device in a future evolved Public Land Mobile Network (PLMN), and embodiments of the present disclosure do not impose specific limitations on this.

Figure 1:
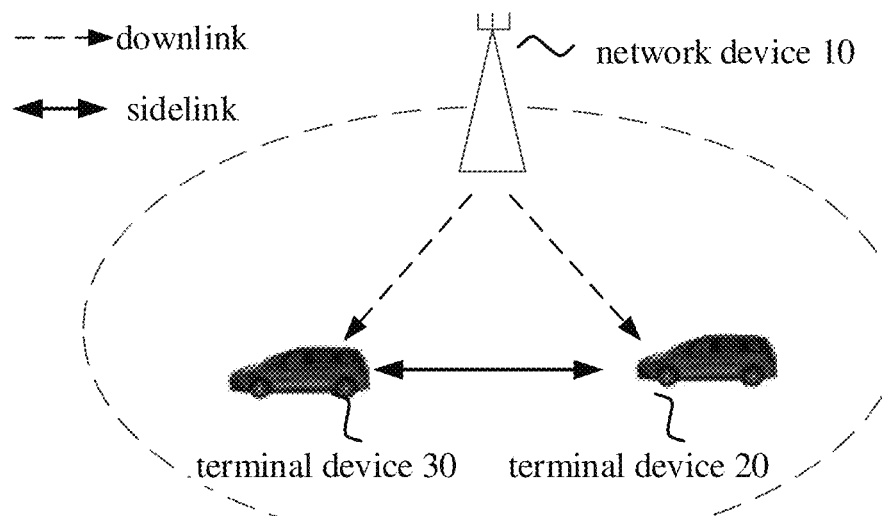
FIG. 1 is a schematic diagram of an application scenario according to an embodiment of the present disclosure.
Figure 2:
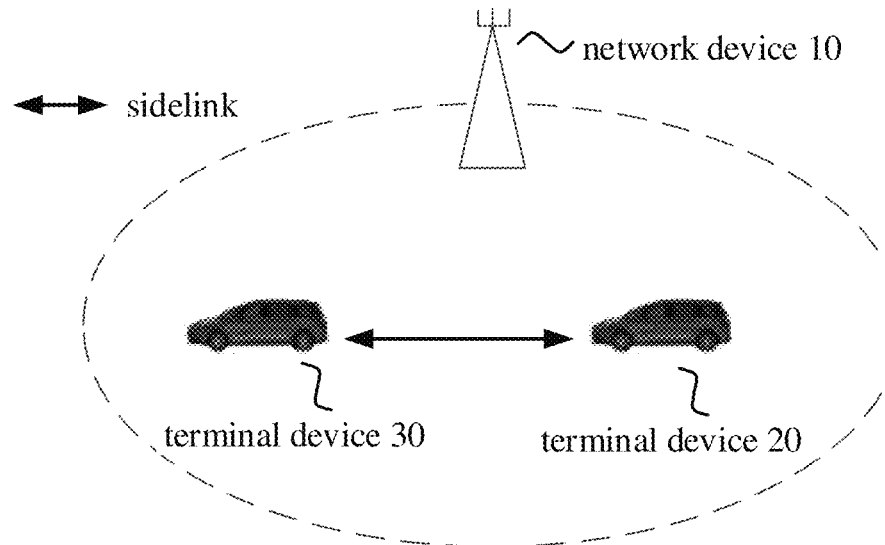
FIG. 2 is a schematic diagram of another application scenario according to an embodiment of the present disclosure.

FIGS. 1 and 2 are schematic diagrams of an application scenario of an embodiment of the present disclosure. FIG. 1 exemplarily shows one network device and two terminal devices. According to other embodiments, the wireless communication system in embodiments of the present disclosure may include multiple network devices, and other numbers of terminal devices may be included in the coverage of each network device, and embodiments of the present disclosure do not impose specific limitations on this.

According to embodiments, the wireless communication system may also include other network entities, such as a Mobile Management Entity (MME), a Serving Gateway (S-GW), a Packet Data Network Gateway (P-GW), and so on; or, the wireless communication system may also include other network entities, such as a Session Management Function (SMF), a Unified Data Management (UDM), an Authentication Server Function (AUSF) and so on, and embodiments of the present disclosure do not impose specific limitations on this.

For example, the terminal device 20 and the terminal device 30 may communicate in a D2D communication mode. When performing D2D communication, the terminal device 20 and the terminal device 30 directly communicate through a D2D link, that is, a sidelink (SL). For example, as shown in FIG. 1 or FIG. 2, the terminal device 20 and the terminal device 30 directly communicate through a sidelink. In FIG. 1, the terminal device 20 and the terminal device 30 communicate through a sidelink, and their transmission resources are allocated by the network device. In FIG. 2, the terminal device 20 and the terminal device 30 communicate through the sidelink, and their transmission resources are independently selected by the terminal devices, and it is not needed for the network device to allocate transmission resources.

D2D communication can refer to Vehicle to Vehicle (V2V) communication or Vehicle to Everything (V2X) communication. In V2X communication, X can generally refer to any device with wireless receiving and sending capabilities, for example, but not limited to slow-moving wireless devices, fast-moving vehicle-mounted devices, or network control nodes with wireless transmitting and receiving capabilities. It should be understood that embodiments of the present disclosure are mainly applied to the scenario of V2X communication but can also be applied to any other D2D communication scenario, and embodiments of the present disclosure do not impose specific limitations on this.

In addition, various aspects or features of the present disclosure can be implemented as methods, devices, or article of manufacture using standard programming and/or engineering techniques. The term "article of manufacture" as used herein encompasses a computer program accessible from any computer-readable device, carrier, or medium. For example, computer-readable medium may include, but not limited to magnetic storage devices (for example, hard disks, floppy disks, or tapes, etc.), optical disks (for example, compact discs (CD), Digital Versatile Disc (DVD), etc.), smart cards and flash memory devices (for example, Erasable Programmable Read-Only Memory (EPROM), cards, sticks or key drives, etc.). In addition, various storage medium described herein may represent one or more devices and/or other machine-readable medium for storing information. The term "machine-readable medium" may include, but is not limited to, various medium capable of storing, containing, and/or carrying instructions and/or data.

It should be understood that the terms "system" and "network" are often used interchangeably herein. The term "and/or" is an association relationship describing associated objects, which means that there can be three relationships. For example, A and/or B can mean: A alone exists, both A and B exist, B alone exists. In addition, the character "/" generally indicates that the associated objects before and after "/" are in an "or" relationship.

Figure 3:
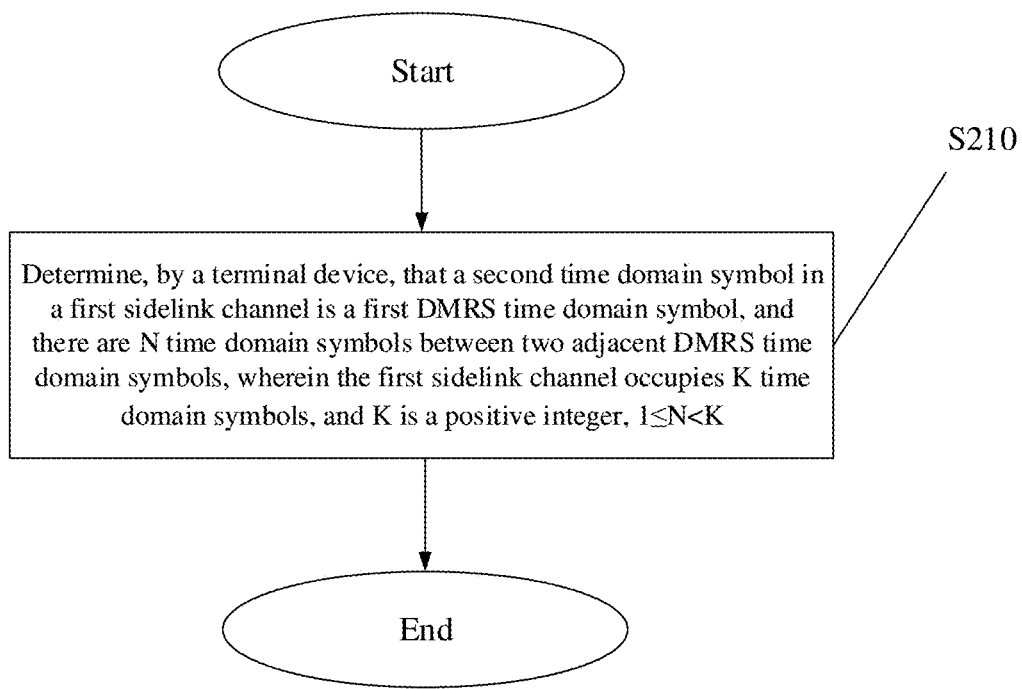
FIG. 3 is a schematic flowchart of a sidelink channel configuration method according to an embodiment of the present disclosure.

FIG. 3 is a schematic flowchart of a sidelink channel configuration method 200 according to an embodiment of the present disclosure. The method 200 includes the followings.

In S210, a terminal device determines that the second time domain symbol in a first sidelink channel is the first DMRS time domain symbol, and there are N time domain symbols between two adjacent DMRS time domain symbols, wherein the first sidelink channel occupies K time domain symbols, and K is a positive integer, $1 \le N < K$.

According to embodiments, the first sidelink channel is any one of PSCCH, PSSCH, a feedback channel, and a Physical Sidelinklink Broadcast Channel (PSBCH).

According to embodiments, the first sidelink channel occupies at least one subframe or slot.

According to embodiments, the first sidelink channel occupies K time domain symbols, where K is a positive integer, and the terminal device determines the value of K according to pre-configuration information or information configured by a network device.

According to embodiments, the first time domain symbol in the first sidelink channel occupying K time domain symbols is used as an Automatic Gain Control (AGC) symbol, which is used for a receiving end to adjust receiver parameters.

According to embodiments, the last time domain symbol in the first sidelink channel occupying K time domain symbols is used as a Guard Period (GP) symbol.

According to other embodiments, if the last time domain symbol in the first sidelink channel is not used as a GP, the symbol can be used to transmit data or DMRS.

According to embodiments, all resource units or some resource units in one Physical Resource Block (PRB) on the time domain symbol where the DMRS is located are used to transmit the DMRS.

According to embodiments, if a part of the resource units in a PRB on the time domain symbol where the DMRS is located is used to transmit the DMRS, the remaining resource units in the PRB are used to transmit data, or no data or signal is transmitted.

It should be understood that N is a positive integer satisfying $1 \le N < K$.

It should be understood that in the embodiments, there are N time domain symbols between two adjacent DMRS time domain symbols, and the value of N is used to determine the position of other DMRS time domain symbols than the first DMRS symbol in the first sidelink channel according to the position of the first DMRS symbol and the value of N. For example, if the position of the first DMRS time domain symbol is the second time domain symbol and N=3, then the position of the second DMRS time domain symbol is the fifth time domain symbol, and the position of the third DMRS time domain symbol is the eighth time domain symbol, and so on. It should be understood that the positions of the DMRS time domain symbols cannot be greater than the number K of time domain symbols occupied by the first sidelink channel. For example, when K=7, only two DMRS symbols are included in the first sidelink channel, which are located at the second and fifth time domain symbols; when K=4, only one DMRS symbol is included in the first sidelink channel, and the one DMRS symbol is located at the second time domain symbol.

Figure 4:
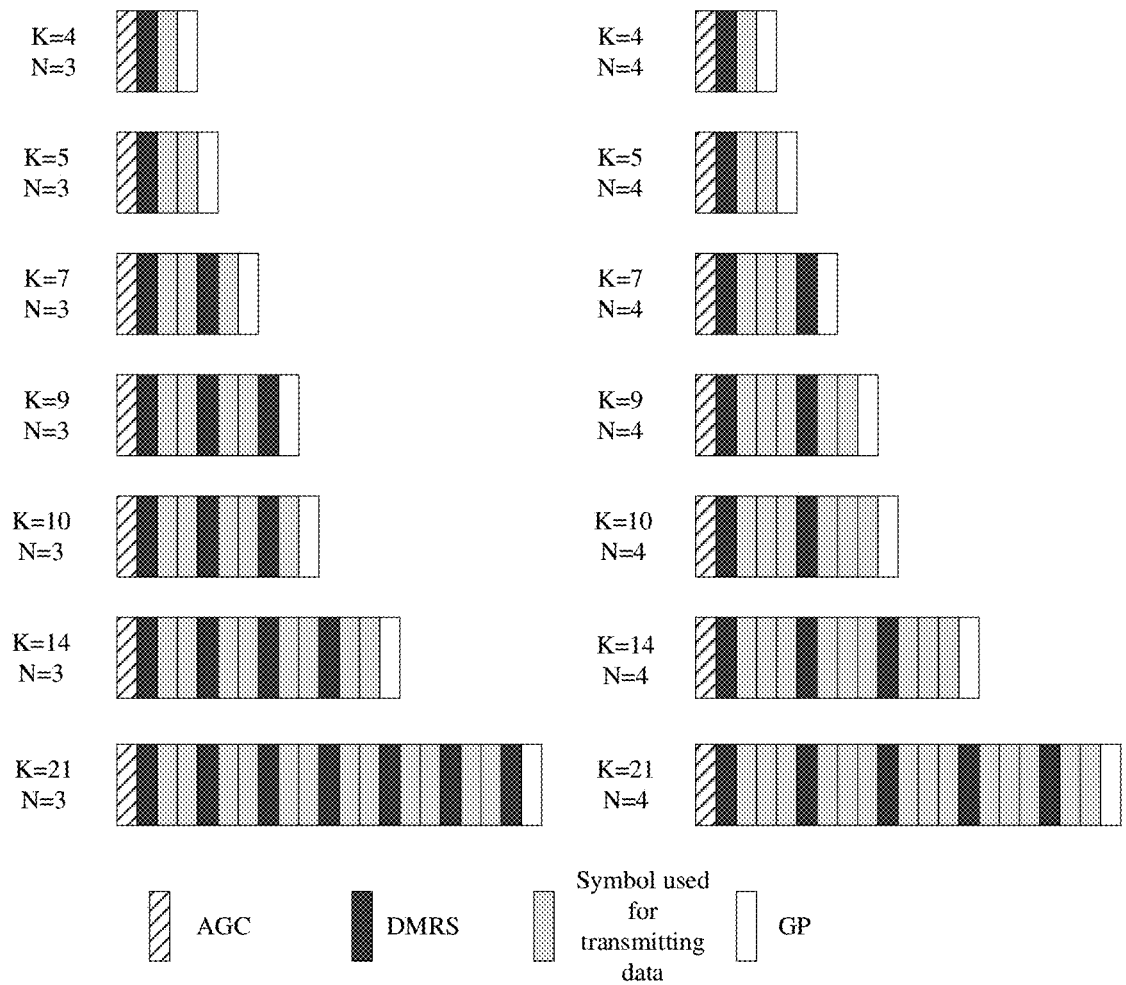
FIG. 4 is a schematic diagram of a DMRS pattern for a first sidelink channel according to an embodiment of the present disclosure.

For example, when the values of K and N change, the DMRS pattern for the first sidelink channel occupying K time domain symbols may be as shown in FIG. 4.

When K=4 and N=3, the second time domain symbol is the first DMRS time domain symbol, and there is only one DMRS time domain symbol. Also, there are one AGC symbol, one symbol for transmitting data, and one GP symbol.

When K=5 and N=3, the second time domain symbol is the first DMRS time domain symbol, and there is only one DMRS time domain symbol. Also, there are one AGC symbol, two symbols for transmitting data, and one GP symbol. Optionally, if the last symbol is not used as a GP symbol, this symbol can be used as the second DMRS symbol.

When K=7 and N=3, the second time domain symbol is the first DMRS time domain symbol, there are two DMRS time domain symbols, and the fifth time domain symbol is the second DMRS time domain symbol. Also, there are one AGC symbol, three symbols for transmitting data and one GP symbol.

When K=9 and N=3, the second time domain symbol is the first DMRS time domain symbol, there are three DMRS time domain symbols, the fifth time domain symbol is the second DMRS time domain symbol, and the eighth time domain symbol is the third DMRS time domain symbol. Also, there are one AGC symbol, four symbols for transmitting data, and one GP symbol.

When K=10 and N=3, the second time domain symbol is the first DMRS time domain symbol, there are three DMRS time domain symbols, the fifth time domain symbol is the second DMRS time domain symbol, and the eighth time domain symbol is the third DMRS time domain symbol. Also, there are one AGC symbol, five symbols for transmitting data, and one GP symbol.

When K=14 and N=3, the second time domain symbol is the first DMRS time domain symbol, there are four DMRS time domain symbols, the fifth time domain symbol is the second DMRS time domain symbol, the eighth time domain symbol is the third DMRS time domain symbol, and the eleventh time domain symbol is the fourth DMRS time domain symbol. Also, there are one AGC symbol, eight symbols for transmitting data, and one GP symbol. Optionally, If the last symbol is not used as a GP symbol, this symbol can be used as the fifth DMRS symbol.

When K=21 and N=3, the second time domain symbol is the first DMRS time domain symbol, there are seven DMRS time domain symbols, the fifth time domain symbol is the second DMRS time domain symbol, the eighth time domain symbol is the third DMRS time domain symbol, the eleventh time domain symbol is the fourth DMRS time domain symbol, the fourteenth time domain symbol is the fifth DMRS time domain symbol, the seventeenth time domain symbol is the sixth DMRS time domain symbol, and the twentieth time domain symbol is the seventh DMRS time domain symbol. Also, there are one AGC symbol, twelve symbols for transmitting data, and one GP symbol.

When K=4 and N=4, the second time domain symbol is the first DMRS time domain symbol, and there is only one DMRS time domain symbol. Also, there are one AGC symbol, one symbol for transmitting data, and one GP symbol.

When K=5 and N=4, the second time domain symbol is the first DMRS time domain symbol, and there is only one DMRS time domain symbol. Also, there are one AGC symbol, two symbols for transmitting data, and one GP symbol.

When K=7 and N=4, the second time domain symbol is the first DMRS time domain symbol, there are two DMRS time domain symbols, and the sixth time domain symbol is the second DMRS time domain symbol. Also, there are one AGC symbol, three symbols for transmitting data, and one GP symbol.

When K=9 and N=4, the second time domain symbol is the first DMRS time domain symbol, there are two DMRS time domain symbols, and the sixth time domain symbol is the second DMRS time domain symbol. Also, there are one AGC symbol, five symbols for transmitting data, and one GP symbol.

When K=10 and N=4, the second time domain symbol is the first DMRS time domain symbol, there are two DMRS time domain symbols, and the sixth time domain symbol is the second DMRS time domain symbol. Also, there are one AGC symbol, six symbols for transmitting data, and one GP symbol. Optionally, if the last symbol is not used as a GP symbol, this symbol can be used as the third DMRS symbol.

When K=14 and N=4, the second time domain symbol is the first DMRS time domain symbol, there are three DMRS time domain symbols, the sixth time domain symbol is the second DMRS time domain symbol, and the tenth time domain symbol is the third DMRS time domain symbol. Also, there are one AGC symbol, nine symbols for transmitting data, and one GP symbol. Optionally, if the last symbol is not used as a GP symbol, the symbol can be used as the fourth DMRS symbol.

When K=21 and N=4, the second time domain symbol is the first DMRS time domain symbol, there are five DMRS time domain symbols. The sixth time domain symbol is the second DMRS time domain symbol, the tenth time domain symbol is the third DMRS time domain symbol, the fourteenth time domain symbol is the fourth DMRS time domain symbol, and the eighteenth time domain symbol is the fifth DMRS time domain symbol. Also, there are one AGC symbol, fourteen symbols for transmitting data, and one GP symbol.

According to embodiments, the terminal device may determine that the second time domain symbol in the first sidelink channel occupying K time domain symbols is the first DMRS time domain symbol using the following methods.

Method 1

The terminal device determines, according to pre-configuration information, that the second time domain symbol in the first sidelink channel occupying K time domain symbols is the first DMRS time domain symbol.

According to embodiments, the pre-configuration information may be pre-configured to the terminal device.

Method 2

The terminal device receives first configuration information sent by the network device. The first configuration information is used to indicate that the second time domain symbol in the first sidelink channel is the first DMRS time domain symbol.

Further, the terminal device may determine the parameter N in the following methods.

In a method a, the N is pre-configured for the terminal device.

In a method b, the N is configured by the network device to the terminal device.

Specifically, the terminal device receives second configuration information sent by the network device, and the second configuration information is used to indicate the N.

In a method c, the terminal device receives third configuration information for configuring a resource pool sent by the network device. The third configuration information is further used to indicate the N corresponding to the DMRS pattern for the first sidelink channel transmitted in the resource pool. Or the third configuration information is further used to indicate the DMRS pattern for the first sidelink channel transmitted in the resource pool.

It should be noted that the terminal device may determine the N through the DMRS pattern for the first sidelink channel.

In a method d, the terminal device receives fourth configuration information sent by the network device. The fourth configuration information is used to indicate first index information, and the terminal device determines the first DMRS pattern according to the first index information and a first correspondence. The first correspondence is a correspondence between index information and DMRS patterns, and the first DMRS pattern is a DMRS pattern for transmitting the first sidelink channel.

It should be noted that the first DMRS pattern may be used to determine the N, and the first DMRS pattern may also be used to determine that the second time domain symbol in the first sidelink channel occupying K time domain symbols is the first DMRS time domain symbol.

According to embodiments, the fourth configuration information may also be used to configure a resource pool. Under such conditions, the first DMRS pattern is a DMRS pattern for transmitting the first sidelink channel in the resource pool.

According to embodiments, the first correspondence is pre-configured for the terminal device, or the first correspondence is configured by the network device for the terminal device.

According to embodiments of the present disclosure, the method 200 further includes determining, in the terminal device, that there are M subcarriers between two adjacent DMRS signals in any one Physical Resource Block (PRB) on each DMRS time domain symbol, M≥1.

It should be understood that the M is a positive integer satisfying M≥1.

According to embodiments, the terminal device may determine the parameter M using the following methods:
Method A: The M is pre-configured for the terminal device; and Method B: The M is configured to the terminal device by the network device.

For example, the terminal device receives fifth configuration information sent by the network device, and the fifth configuration information is used to indicate the M.

Method C: The terminal device receives the sixth configuration information for configuring a resource pool sent by the network device. The sixth configuration information is further used to indicate the M corresponding to the DMRS pattern for the first sidelink channel transmitted in the resource pool, or the sixth configuration information is further used to indicate the DMRS pattern for the first sidelink channel transmitted in the resource pool.

It should be noted that the DMRS pattern for the first sidelink channel can be used to determine the M.

Method D: The terminal device receives seventh configuration information sent by the network device. The seventh configuration information is used to indicate second index information, and the terminal device determines the second DMRS pattern according to the second index information and a second correspondence. The second correspondence is a correspondence between the index information and DMRS patterns, and the second DMRS pattern is a DMRS pattern for transmitting the first sidelink channel.

It should be noted that the second DMRS pattern may be used to determine the M, and the second DMRS pattern may also be used to determine that the second time domain symbol in the first sidelink channel that occupies K time domain symbols is the first DMRS time domain symbol and can be used to determine the N.

According to embodiments, the seventh configuration information can also be used to configure a resource pool. Under such conditions, the second DMRS pattern is a DMRS pattern for transmitting the first sidelink channel in the resource pool.

According to embodiments, the second correspondence is pre-configured to the terminal device, or the second correspondence is configured to the terminal device by the network device.

In embodiments of the present disclosure, the terminal device receives the first configuration information, or the second configuration information, or the third configuration information, or the fourth configuration information, or the fifth configuration information, or the sixth configuration information, or the seventh configuration information, or the first correspondence, or the second correspondence sent from the network device by a broadcast message or dedicated Radio Resource Control (RRC) signaling or control signaling.

According to embodiments, the control signaling may be Downlink Control Information (DCI).

In embodiments of the present disclosure, multiple of the first configuration information, the second configuration information, the third configuration information, the fourth configuration information, the fifth configuration information, the sixth configuration information, and the seventh configuration information can be the same configuration information.

For example, according to embodiments, the second configuration information in the above method b and the fifth configuration information in the method B may be the same configuration information. That is, the configuration information indicates the M and the N at the same time.

For another example, according to embodiments, the third configuration information in the above method c and the sixth configuration information in the method C may be the same configuration information. That is, the configuration information indicates the M or the N corresponding to the DMRS pattern for the first sidelink channel transmitted in the resource pool and.

For another example, according to embodiments, the fourth configuration information in the method d and the seventh configuration information in the method D may be the same configuration information, that is, the index information indicated by the configuration information along with the correspondence between the index information and the DMRS patterns can be used to determine a DMRS pattern, and the DMRS pattern can be used to determine both the N and the M.

In embodiments of the present disclosure, the DMRS pattern for the PSSCH is indicated by the PSCCH corresponding to the PSSCH, and/or the M or the N corresponding to the DMRS for the PSSCH is indicated by the PSCCH corresponding to the PSSCH.

In embodiments of the present disclosure, the PSCCH and the PSSCH have different DMRS patterns, and/or the M or the N corresponding to the DMRS for the PSCCH is different from the M or the N corresponding to the DMRS for the PSSCH.

Therefore, in embodiments of the present disclosure, the terminal device can determine that the second time domain symbol in the first sidelink channel that occupies K time domain symbols is the first DMRS time domain symbol, and there are N time domain symbols between two adjacent DMRS time domains. Thus, it can be flexibly configured that the DMRS for the first sidelink channel occupies a part of the K time domain symbols, thereby meeting the requirements for data interaction in NR-based V2X.

Figure 5:
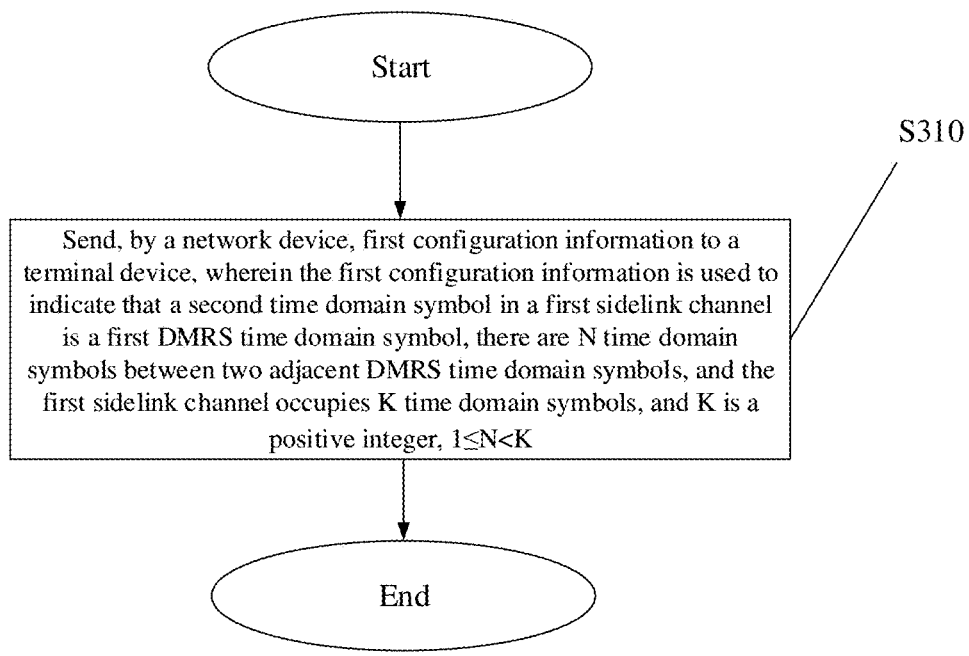
FIG. 5 is a schematic flowchart of a sidelink channel configuration method according to an embodiment of the present disclosure.

FIG. 5 is a schematic flowchart of a sidelink channel configuration method 300 according to an embodiment of the present disclosure. The method 300 includes the following.

In S310, a network device sends first configuration information to a terminal device. The first configuration information is used to indicate that a second time domain symbol in a first sidelink channel is a first DMRS time domain symbol, there are N time domain symbols between two adjacent DMRS time domain symbols, and the first sidelink channel occupies K time domain symbols, and K is a positive integer, $1 \leq N < K$.

According to embodiments, the first sidelink channel is any one of a PSCCH, a PSSCH, a feedback channel, and a PSBCH.

According to embodiments, the first sidelink channel occupies at least one subframe or slot.

According to embodiments, the first sidelink channel occupies K time domain symbols, wherein K is a positive integer. The network device sends tenth configuration information to the terminal device, and the tenth configuration information is used for the terminal device to determine the value of K.

According to embodiments, the first time domain symbol in the first sidelink channel occupying K time domain symbols is used as an AGC symbol for the receiving end to adjust receiver parameters.

According to embodiments, the last time domain symbol in the first sidelink channel occupying K time domain symbols is used as a GP symbol.

According to other embodiments, if the last time domain symbol in the first sidelink channel is not used as a GP, the symbol can be used to transmit data or DMRS.

According to embodiments, all resource units or some resource units in one physical resource block (PRB) on the time domain symbol where the DMRS is located are used to transmit the DMRS.

According to embodiments, if a part of the resource units in a PRB on the time domain symbol where the DMRS is located is used to transmit the DMRS, the remaining resource units in the PRB are used to transmit data, or no data or signal is transmitted.

It should be understood that the N is a positive integer satisfying $1 \leq N < K$.

It should be understood that in the embodiments, there are N time domain symbols between two adjacent DMRS time domain symbols, and the value of N is used to determine the position of other DMRS time domain symbols than the first DMRS symbol in the first sidelink channel according to the position of the first DMRS symbol and the value of N. For example, if the position of the first DMRS time domain symbol is the second time domain symbol and N=3, then the position of the second DMRS time domain symbol is the fifth time domain symbol, and the position of the third DMRS time domain symbol is the eighth time domain symbol, and so on. It should be understood that the positions of the DMRS time domain symbols cannot be greater than the number K of time domain symbols occupied by the first sidelink channel. For example, when K=7, only two DMRS symbols are included in the first sidelink channel, which are located at the second and fifth time domain symbols; when K=4, only one DMRS symbol is included in the first sidelink channel, and the one DMRS symbol is located at the second time domain symbol.

According to embodiments, the network device can configure the N using the following methods.

Method 1

The network device sends second configuration information to the terminal device, and the second configuration information is used to indicate the N.

Method 2

The network device sends to the terminal device third configuration information for configuring a resource pool. The third configuration information is further used to indicate the N corresponding to the DMRS pattern for the first sidelink channel transmitted in the resource pool, or the third configuration information is further used to indicate the DMRS pattern for the first sidelink channel transmitted in the resource pool.

It should be noted that the terminal device may determine the N by the DMRS pattern for the first sidelink channel.

Method 3

The network device sends fourth configuration information to the terminal device. The fourth configuration information is used to indicate first index information, and the first index information is used for the terminal device to determine the first DMRS pattern according to the first index information and the first correspondence. The first DMRS pattern is a DMRS pattern for transmitting the first sidelink channel, and the first correspondence is a correspondence between index information and DMRS patterns.

It should be noted that the terminal device may determine the N according to the first DMRS pattern, and the terminal device may also determine that the second time domain symbol in the first sidelink channels that occupies K time domain symbols is the first DMRS time domain symbol according to the first DMRS pattern.

According to embodiments, the first correspondence may be pre-configured for the terminal device.

According to embodiments, the first correspondence may be configured by the network device to the terminal device. For example, the network device sends fifth configuration information to the terminal device, and the fifth configuration information is used to indicate the first correspondence.

In embodiments of the present disclosure, the first configuration information is also used to indicate that there are M subcarriers between two adjacent DMRS signals in any one PRB on each DMRS time domain symbol, where $M \geq 1$.

According to embodiments, the network device can configure the M using the following methods.

Method A

The network device sends sixth configuration information to the terminal device, and the sixth configuration information is used to indicate the M.

Method B

The network device sends to the terminal device seventh configuration information used to configure the resource pool, and the seventh configuration information is further used to indicate the M corresponding to the DMRS pattern for the first sidelink channel transmitted in the resource pool, or the seventh configuration information is further used to indicate the DMRS pattern for the first sidelink channel transmitted in the resource pool.

It should be noted that the terminal device may determine the M according to the DMRS pattern for the first sidelink channel.

Method C

The network device sends eighth configuration information to the terminal device, and the eighth configuration information is used to indicate second index information. The second index information is used for the terminal device to determine the second DMRS pattern according to the second index information and the second correspondence. The second DMRS pattern is a DMRS pattern for transmitting the first sidelink channel, and the second correspondence is a correspondence between index information and DMRS patterns.

It should be noted that the terminal device may determine the M according to the second DMRS pattern, and the terminal device may determine that the second time domain symbol in the first sidelink channel occupying K time domain symbols is the first DMRS symbol according to the first DMRS pattern.

According to embodiments, the second correspondence may be pre-configured for the terminal device.

According to embodiments, the second correspondence may be configured by the network device to the terminal device. For example, the network device sends ninth configuration information to the terminal device, and the ninth configuration information is used to indicate the second correspondence.

In embodiments of the present disclosure, the network device sends the first configuration information, or the second configuration information, or the third configuration information, or the fourth configuration information, or the fifth configuration information, or the sixth configuration information, or the seventh configuration information, or the eighth configuration information, or the ninth configuration information to the terminal device by a broadcast message or dedicated RRC signaling or control signaling.

In the embodiment of the present disclosure, multiple of the first configuration information, the second configuration information, the third configuration information, the fourth configuration information, the fifth configuration information, the sixth configuration information, the seventh configuration information, the eighth configuration information and the ninth configuration information can be the same configuration information.

For example, according to embodiments, the second configuration information in the method 1 and the sixth configuration information in the method A may be the same configuration information, that is, the configuration information indicates the M and the N at the same time.

For another example, according to embodiments, the third configuration information in the method 2 and the seventh configuration information in the method B may be the same configuration information, that is, the configuration information indicates the M and the N corresponding to the DMRS pattern for the first sidelink channel transmitted in the resource pool.

For another example, according to embodiments, the fourth configuration information in the method 3 and the eighth configuration information in the method C may be the same configuration information, that is, the index information indicated by the configuration information along with the correspondence between index information and DMRS patters is used to determine a DMRS pattern, and the DMRS pattern can be used to determine both the N and the M.

For another example, according to embodiments, the fifth configuration information in the method 3 and the ninth configuration information in the method C may be the same configuration information, that is, the configuration information indicates the first correspondence and the second correspondence or indicates only one of the first correspondence and the second correspondence.

In embodiments of the present disclosure, the DMRS pattern for the PSSCH is indicated by the PSCCH corresponding to the PSSCH, and/or the M or the N corresponding to the DMRS for the PSSCH indicated by the PSCCH corresponding to the PSSCH.

In embodiments of the present disclosure, the PSCCH and the PSSCH have different DMRS patterns, and/or the M or the N corresponding to the DMRS for the PSCCH is different from the M or the N corresponding to the DMRS for the PSSCH.

It should be understood that details regarding the steps in the sidelink channel configuration method 300 can be found in the description regarding the corresponding steps in the sidelink channel configuration method 200, and repeated descriptions are omitted.

Therefore, in embodiments of the present disclosure, the network device configures that the second time domain symbol in the first sidelink channel occupying K time domain symbols is the first DMRS time domain symbol, and there are N time domain symbols between two adjacent DMRS time domain symbols. Accordingly, the terminal device can determine that the second time domain symbol in the first sidelink channel occupying K time domain symbols is the first DMRS time domain symbol, and there are N time domain symbols between two adjacent DMRS time domain symbols. Thus, it can be flexibly configured that the DMRS for the first sidelink channel occupies a part of the K time domain symbols, thereby meeting the requirements for data interaction in NR-based V2X.

Figure 6:
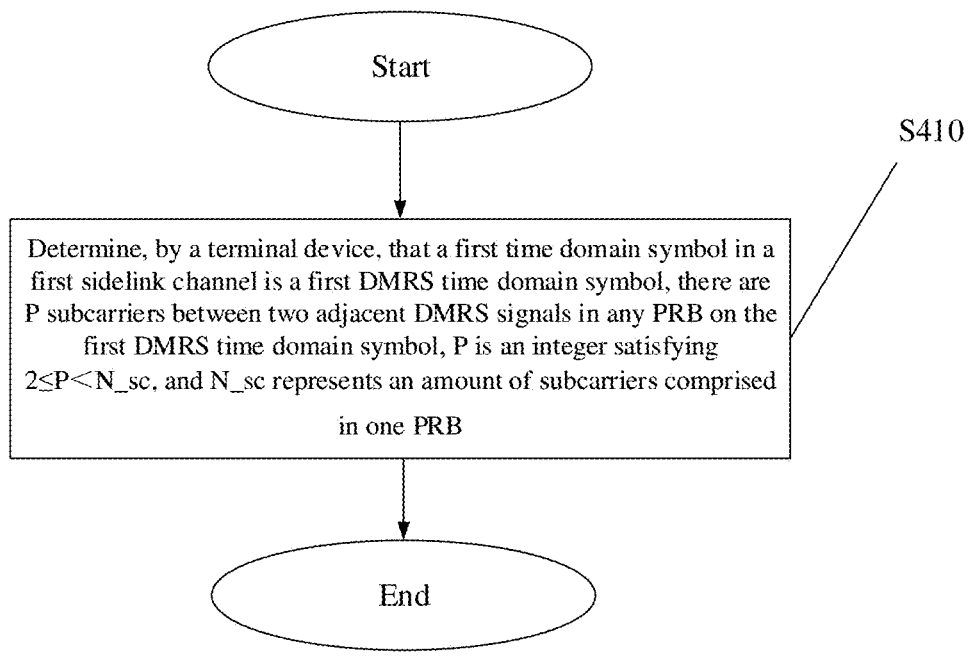
FIG. 6 is a schematic flowchart of a sidelink channel configuration method according to an embodiment of the present disclosure.

FIG. 6 is a schematic flowchart of a sidelink channel configuration method 400 according to an embodiment of the present disclosure. The method 400 includes the following.

In S410, a terminal device determines that a first time domain symbol in a first sidelink channel is a first DMRS time domain symbol, there are P subcarriers between two adjacent DMRS signals in any PRB on the first DMRS time domain symbol, P is an integer satisfying $2 \leq P < N\_sc$, and $N\_sc$ represents an amount of subcarriers included in one PRB.

According to embodiments, there are Q time domain symbols between two adjacent DMRS time domain symbols for the first sidelink channel, the first sidelink channel occupies K time domain symbols, K is a positive integer, and Q is an integer satisfying $1 \leq Q < K$.

According to embodiments, the parameters P and/or Q are one of the following: pre-configured parameters, or parameters configured by a network device, or parameters determined by configuration information sent by other terminal devices.

According to embodiments, on the first DMRS time domain symbol, a frequency domain position of a first DMRS signal in any PRB is one of the following: pre-configuration information, or information configured by a network device, or information determined by configuration information sent by other terminal devices.

According to embodiments, the first sidelink channel is any one of a PSCCH, a PSSCH, a feedback channel, and a PSBCH.

According to embodiments, a DMRS pattern for the PSSCH is indicated by a PSCCH corresponding to the PSSCH, and/or the P or the Q corresponding to DMRS for the PSSCH is indicated by the PSCCH corresponding to the PSSCH.

According to embodiments, the PSCCH and the PSSCH have different DMRS patterns, and/or, the P or the Q corresponding to the DMRS for the PSCCH is different from the P or the Q corresponding to the DMRS for the PSSCH.

According to embodiments, the first sidelink channel occupies at least one subframe or slot.

According to embodiments, the first sidelink channel occupies K time domain symbols, where K is a positive integer, and the terminal device determines a value of the K according to pre-configuration information or configuration information from a network device.

According to embodiments, the first time domain symbol in the first sidelink channel occupying K time domain symbols is used as an AGC symbol for the receiving end to adjust receiver parameters.

According to embodiments, the last time domain symbol in the first sidelink channel occupying K time domain symbols is used as a GP symbol.

According to other embodiments, if the last time domain symbol in the first sidelink channel is not used as a GP, the symbol can be used to transmit data or DMRS.

According to embodiments, a part of the resource units in a PRB on the time domain symbol where the first DMRS is located is used to transmit the DMRS, and the remaining resource units in the PRB are not used to transmit any data or signals.

According to embodiments, on other DMRS time domain symbols except for the time domain symbol where the first DMRS is located, a part of the resource units in any PRB is used to transmit DMRS, and the remaining resource units in the PRB are used to transmit data, or not used to transmit any data or signals.

It should be understood that in the embodiment, there are Q time domain symbols spaced between two adjacent DMRS time domain symbols, and the value of Q is used to determine the position of other DMRS time domain symbols than the first DMRS symbol in the first sidelink channel according to the position of the first DMRS symbol and the value of Q. For example, if the position of the first DMRS time domain symbol is the first time domain symbol and Q=3, then the position of the second DMRS time domain symbol is the fourth time domain symbol, and the position of the third DMRS time domain symbol is the seventh time domain symbol, and so on. It should be understood that the positions of the DMRS time domain symbols cannot be greater than the number K of time domain symbols occupied by the first sidelink channel.

Therefore, in embodiments of the present disclosure, the terminal device can determine that the first time domain symbol in the first sidelink channel occupying K time domain symbols is the first DMRS time domain symbol, and there are P subcarriers between two adjacent DMRS signals in any PRB on the first DMRS time domain symbol. Thus, it can be flexibly configured that the DMRS for the first sidelink channel occupies a part of the K time domain symbols, thereby meeting the requirements for data interaction in NR-based V2X.

Figure 7:
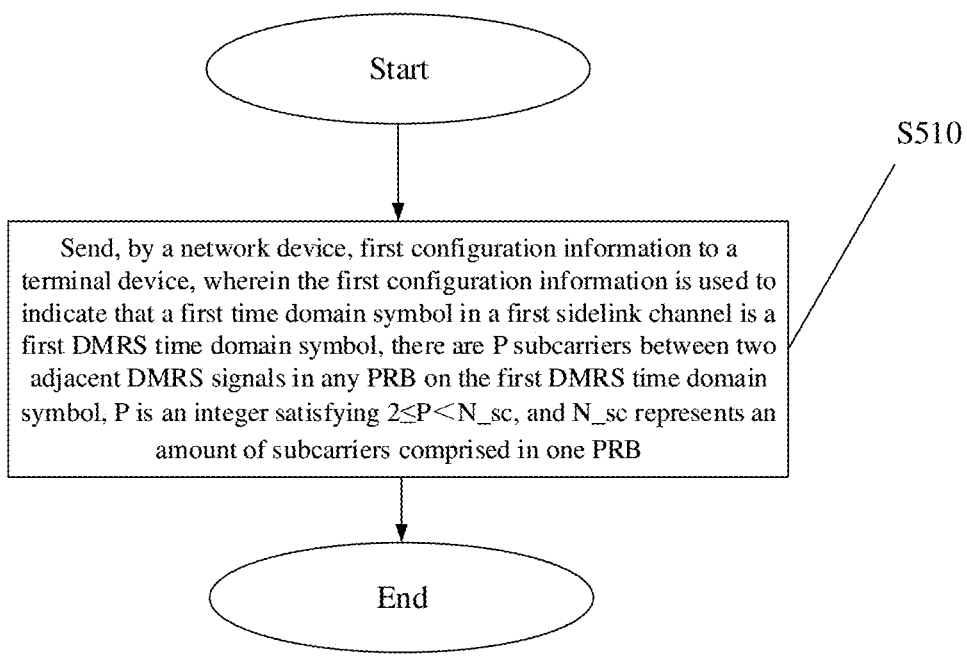
FIG. 7 is a schematic flowchart of a sidelink channel configuration method according to an embodiment of the present disclosure.

FIG. 7 is a schematic flowchart of a sidelink channel configuration method 500 according to an embodiment of the present disclosure. The method 500 includes the following.

In S510, a network device sends first configuration information to a terminal device. The first configuration information is used to indicate that a first time domain symbol in a first sidelink channel is a first DMRS time domain symbol, there are P subcarriers between two adjacent DMRS signals in any PRB on the first DMRS time domain symbol, P is an integer satisfying $2 \leq P < N\_sc$, and N_sc represents an amount of subcarriers included in one PRB.

According to embodiments, there are Q time domain symbols between two adjacent DMRS time domain symbols for the first sidelink channel, the first sidelink channel occupies K time domain symbols, K is a positive integer, and Q is an integer satisfying $1 \leq Q < K$.

According to embodiments, the method further includes sending, by the network device, second configuration information to the terminal device, wherein the second configuration information is used to indicate the parameters P and/or Q.

According to embodiments, the network device sends third configuration information to the terminal device, and the third configuration information is used to indicate a frequency domain position of a first DMRS signal in any PRB on the first DMRS time domain symbol.

According to embodiments, the first sidelink channel is any one of a PSCCH, a PSSCH, a feedback channel, and a PSBCH.

According to embodiments, a DMRS pattern for the PSSCH is indicated by a PSCCH corresponding to the PSSCH, and/or the P or the Q corresponding to DMRS for the PSSCH is indicated by the PSCCH corresponding to the PSSCH.

According to embodiments, the PSCCH and the PSSCH have different DMRS patterns, and/or, the P or the Q corresponding to the DMRS for the PSCCH is different from the P or the Q corresponding to the DMRS for the PSSCH.

According to embodiments, the first sidelink channel occupies at least one subframe or slot.

According to embodiments, the first sidelink channel occupies K time domain symbols, K is a positive integer, and the network device sends fourth configuration information to the terminal device, and the fourth configuration information is used for the terminal device to determine a value of the K.

It should be understood that details regarding the steps in the sidelink channel configuration method 500 can be found in the description regarding the corresponding steps in the sidelink channel configuration method 400, and repeated descriptions are omitted.

Therefore, in embodiments of the present disclosure, the network device configures that the first time domain symbol in the first sidelink channel occupying K time domain symbols is the first DMRS time domain symbol, and there are P subcarriers between two adjacent DMRS signals in any PRB on the first DMRS time domain symbol. Accordingly, the terminal device can determine that the first time domain symbol in the first sidelink channel occupying K time domain symbols is the first DMRS time domain symbol, and there are P subcarriers between two adjacent DMRS signals in any PRB on the first DMRS time domain symbol. Thus, it can be flexibly configured that the DMRS for the first sidelink channel occupies a part of the K time domain symbols, thereby meeting the requirements for data interaction in NR-based V2X.

Figure 8:
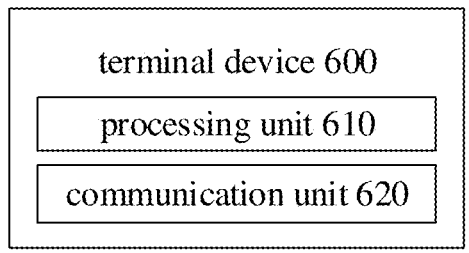
FIG. 8 is a schematic block diagram of a terminal device according to an embodiment of the present disclosure.

FIG. 8 is a schematic block diagram of a terminal device 600 according to an embodiment of the present disclosure. The terminal device 600 includes a processing unit 610.

The processing unit 610 is configured to determine that a second time domain symbol in a first sidelink channel is a first DMRS time domain symbol, and there are N time domain symbols between two adjacent DMRS time domain symbols, wherein the first sidelink channel occupies K time domain symbols, and K is a positive integer, where 1≤N<K.

According to embodiments, the processing unit 610 is configured to, according to pre-configuration information, determine that the second time domain symbol in the first sidelink channel that occupies the K time domain symbols is the first DMRS time domain symbol.

According to embodiments, the terminal device 600 further includes a communication unit 620 configured to receive first configuration information sent from a network device, wherein the first configuration information is used to indicate that the second time domain symbol in the first sidelink channel is the first DMRS time domain symbol.

According to embodiments, the communication unit 620 is configured to receive the first configuration information sent from the network device by a broadcast message or dedicated RRC signaling or control signaling.

According to embodiments, the N is pre-configured to the terminal device, or the N is configured to the terminal device by a network device.

According to embodiments, when the N is configured by the network device to the terminal device, the communication unit 620 is further configured to receive second configuration information sent from the network device, wherein the second configuration information is used to indicate the N.

According to embodiments, the communication unit 620 is configured to receive the second configuration information sent from the network device by a broadcast message or dedicated RRC signaling or control signaling.

According to embodiments, the communication unit 620 is further configured to receive third configuration information for configuring a resource pool sent from a network device, wherein the third configuration information is further used to indicate the N corresponding to a DMRS pattern for the first sidelink channel transmitted in the resource pool, or the third configuration information is further used to indicate the DMRS pattern for the first sidelink channel transmitted in the resource pool.

According to embodiments, the communication unit 620 is further configured to receive fourth configuration information sent from a network device, wherein the fourth configuration information is used to indicate first index information. The processing unit 610 is further configured to determine a first DMRS pattern according to the first index information and a first correspondence, wherein the first correspondence is a correspondence between index information and DMRS patterns, and the first DMRS pattern is a DMRS pattern for transmitting the first sidelink channel.

According to embodiments, the first correspondence is pre-configured to the terminal device, or the first correspondence is configured by the network device to the terminal device.

According to embodiments, the processing unit 610 is further configured to determine that there are M subcarriers between two adjacent DMRS signals in any PRB on each DMRS time domain symbol, M≥1.

According to embodiments, the M is pre-configured to the terminal device, or the M is configured by the network device to the terminal device.

According to embodiments, when the M is configured by the network device to the terminal device, the communication unit 620 is further configured to receive fifth configuration information sent from the network device, wherein the fifth configuration information is used to indicate the M.

According to embodiments, the communication unit 620 is configured to receive the fifth configuration information sent from the network device by a broadcast message or dedicated RRC signaling or control signaling.

According to embodiments, the communication unit 620 is further configured to receive sixth configuration information for configuring a resource pool sent from the network device, wherein the sixth configuration information is further used to indicate the M corresponding to a DMRS pattern for the first sidelink channel transmitted in the resource pool, or the sixth configuration information is further used to indicate the DMRS pattern for the first sidelink channel transmitted in the resource pool.

According to embodiments, the communication unit 620 is further configured to receive seventh configuration information sent from a network device, wherein the seventh configuration information is used to indicate second index information. The processing unit 610 is further configured to determine a second DMRS pattern according to the second index information and a second correspondence, wherein the second correspondence is a correspondence between index information and DMRS patterns, and the second DMRS pattern is a DMRS pattern for transmitting the first sidelink channel.

According to embodiments, the second correspondence is pre-configured to the terminal device, or the second correspondence is configured by the network device to the terminal device.

According to embodiments, the first sidelink channel is any one of a PSCCH, a PSSCH, a feedback channel, and a PSBCH.

According to embodiments, a DMRS pattern for the PSSCH is indicated by a PSCCH corresponding to the PSSCH, and/or the M or the N corresponding to DMRS for the PSSCH is indicated by the PSCCH corresponding to the PSSCH.

According to embodiments, the PSCCH and the PSSCH have different DMRS patterns, and/or, the M or the N corresponding to the DMRS for the PSCCH is different from the M or the N corresponding to the DMRS for the PSSCH.

According to embodiments, the first sidelink channel occupies at least one subframe or slot.

According to embodiments, the first side channel occupies K time domain symbols, where K is a positive integer, and the processing unit 610 determines the value of K according to pre-configuration information or information configured by the network device.

It should be understood that the above and other operations and/or functions of various modules in the terminal device 600 according to embodiments of the present disclosure are used to implement the corresponding processes of the terminal device in the method 200 in FIG. 3, and repeated descriptions are omitted here for brevity.

Figure 9:
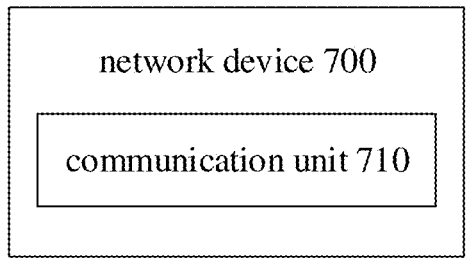
FIG. 9 is a schematic block diagram of a network device according to an embodiment of the present disclosure.

FIG. 9 is a schematic block diagram of a network device 700 according to an embodiment of the present disclosure. The network device includes a communication unit 710.

The communication unit 710 is configured to send first configuration information to a terminal device, wherein the first configuration information is used to indicate that a second time domain symbol in a first sidelink channel is a first DMRS time domain symbol, there are N time domain symbols between two adjacent DMRS time domain symbols, and the first sidelink channel occupies K time domain symbols, and K is a positive integer, where 1≤N<K.

According to embodiments, the communication unit 710 is further configured to send second configuration information to the terminal device, wherein the second configuration information is used to indicate the N.

According to embodiments, the communication unit 710 is further configured to send the first configuration information and/or the second configuration information to the terminal device by a broadcast message or dedicated RRC signaling or control signaling.

According to embodiments, the communication unit 710 is further configured to send third configuration information for configuring a resource pool to the terminal device, wherein the third configuration information is further used to indicate the N corresponding to a DMRS pattern for the first sidelink channel transmitted in the resource pool, or the third configuration information is further used to indicate the DMRS pattern for the first sidelink channel transmitted in the resource pool.

According to embodiments, the communication unit 710 is further configured to send fourth configuration information to the terminal device, wherein the fourth configuration information is used to indicate first index information. The first index information is used for the terminal device to determine a first DMRS pattern according to the first index information and a first correspondence, the first DMRS pattern is a DMRS pattern for transmitting the first sidelink channel, and the first correspondence is a correspondence between index information and DMRS patterns.

According to embodiments, the communication unit 710 is further configured to send fifth configuration information to the terminal device, wherein the fifth configuration information is used to indicate the first correspondence.

According to embodiments, the first configuration information is further used to indicate that there are M subcarriers between two adjacent DMRS signals in any Physical Resource Block (PRB) on each DMRS time domain symbol, where $M \geq 1$.

According to embodiments, the communication unit 710 is further configured to send sixth configuration information to the terminal device, wherein the sixth configuration information is used to indicate the M.

According to embodiments, the communication unit 710 is configured to send the first configuration information and/or the sixth configuration information to the terminal device by a broadcast message or dedicated RRC signaling or control signaling.

According to embodiments, the communication unit 710 is further configured to send seventh configuration information for configuring a resource pool to the terminal device, wherein the seventh configuration information is further used to indicate the M corresponding to a DMRS pattern for the first sidelink channel transmitted in the resource pool, or the seventh configuration information is further used to indicate the DMRS pattern for the first sidelink channel transmitted in the resource pool.

According to embodiments, the communication unit 710 is further configured to send eighth configuration information to the terminal device, wherein the eighth configuration information is used to indicate second index information, the second index information is used for the terminal device to determines a second DMRS pattern according to the second index information and a second correspondence, the second DMRS pattern is a DMRS pattern for transmitting the first sidelink channel, and the second correspondence is a correspondence between index information and DMRS patterns.

According to embodiments, the communication unit 710 is further configured to send ninth configuration information to the terminal device, wherein the ninth configuration information is used to indicate the second correspondence.

According to embodiments, the first sidelink channel is any one of a PSCCH, a PSSCH, a feedback channel, and a PSBCH.

According to embodiments, a DMRS pattern for the PSSCH is indicated by a PSCCH corresponding to the PSSCH, and/or the M, or the N corresponding to DMRS for the PSSCH is indicated by the PSCCH corresponding to the PSSCH.

According to embodiments, the PSCCH and the PSSCH have different DMRS patterns, and/or, the M or the N corresponding to the DMRS for the PSCCH is different from the M or the N corresponding to the DMRS for the PSSCH.

According to embodiments, the first sidelink channel occupies at least one subframe or slot.

According to embodiments, the first side channel occupies K time domain symbols, where K is a positive integer, and the communication unit 710 is further configured to send tenth configuration information to the terminal device, and the tenth configuration information is used for the terminal device to determine the value of K.

It should be understood that the above and other operations and/or functions of various modules in the network device 700 according to embodiments of the present disclosure are used to implement the corresponding processes of the network device in the method 300 in FIG. 5, and repeated descriptions are omitted here for brevity.

Figure 10:
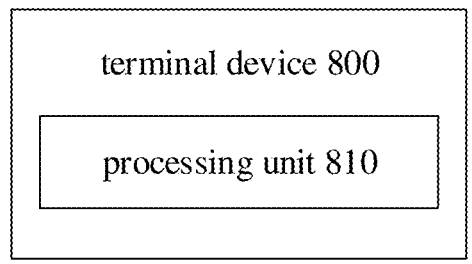
FIG. 10 is a schematic block diagram of a terminal device according to an embodiment of the present disclosure.

FIG. 10 is a schematic block diagram of a terminal device 800 according to an embodiment of the present disclosure. The terminal device 800 includes a processing unit 810.

The processing unit 810 is configured to determine that a first time domain symbol in a first sidelink channel is a first DMRS time domain symbol, there are P subcarriers between two adjacent DMRS signals in any PRB on the first DMRS time domain symbol, P is an integer satisfying $2 \leq P < N\_sc$, and N_sc represents an amount of subcarriers included in one PRB.

According to embodiments, there are Q time domain symbols between two adjacent DMRS time domain symbols for the first sidelink channel, the first sidelink channel occupies K time domain symbols, K is a positive integer, and Q is an integer satisfying $1 \leq Q < K$.

According to embodiments, the parameters P and/or Q are one of the following: pre-configured parameters, or parameters configured by a network device, or parameters determined by configuration information sent by other terminal devices.

According to embodiments, on the first DMRS time domain symbol, a frequency domain position of a first DMRS signal in any PRB is one of the following: pre-configuration information, or information configured by a network device, or information determined by configuration information sent by other terminal devices.

According to embodiments, the first sidelink channel is any one of a PSCCH, a PSSCH, a feedback channel, and a PSBCH.

According to embodiments, a DMRS pattern for the PSSCH is indicated by a PSCCH corresponding to the PSSCH, and/or the P or the Q corresponding to DMRS for the PSSCH is indicated by the PSCCH corresponding to the PSSCH.

According to embodiments, the PSCCH and the PSSCH have different DMRS patterns, and/or, the P or the Q corresponding to the DMRS for the PSCCH is different from the P or the Q corresponding to the DMRS for the PSSCH.

According to embodiments, the first sidelink channel occupies K time domain symbols, K is a positive integer, and the processing unit 810 is further configured to determine a value of the K according to pre-configuration information or configuration information from a network device.

It should be understood that the above and other operations and/or functions of various modules in the terminal device 800 according to embodiments of the present disclosure are used to implement the corresponding processes of the terminal device in the method 400 in FIG. 6, and repeated descriptions are omitted here for brevity.

Figure 11:
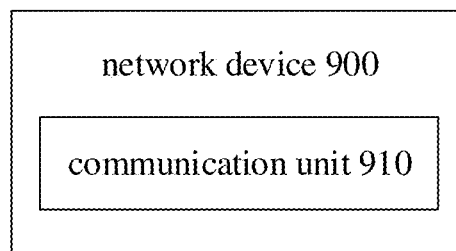
FIG. 11 is a schematic block diagram of a network device according to an embodiment of the present disclosure.

FIG. 11 is a schematic block diagram of a network device 900 according to an embodiment of the present disclosure. The network device 900 includes a communication unit 910.

The communication unit 910 is configured to send first configuration information to a terminal device, wherein the first configuration information is used to indicate that a first time domain symbol in a first sidelink channel is a first DMRS time domain symbol, there are P subcarriers between two adjacent DMRS signals in any PRB on the first DMRS time domain symbol, P is an integer satisfying 2≤P<N_sc, and N_sc represents an amount of subcarriers included in one PRB.

According to embodiments, there are Q time domain symbols between two adjacent DMRS time domain symbols for the first sidelink channel, the first sidelink channel occupies K time domain symbols, K is a positive integer, and Q is an integer satisfying 1≤Q<K.

According to embodiments, the communication unit 910 is further configured to send second configuration information to the terminal device, wherein the second configuration information is used to indicate the parameters P and/or Q.

According to embodiments, the communication unit 910 is further configured to send third configuration information to the terminal device, and the third configuration information is used to indicate a frequency domain position of a first DMRS signal in any PRB on the first DMRS time domain symbol.

According to embodiments, the first sidelink channel is any one of a PSCCH, a PSSCH, a feedback channel, and a PSBCH.

According to embodiments, a DMRS pattern for the PSSCH is indicated by a PSCCH corresponding to the PSSCH, and/or the P or the Q corresponding to DMRS for the PSSCH is indicated by the PSCCH corresponding to the PSSCH.

According to embodiments, the PSCCH and the PSSCH have different DMRS patterns, and/or, the P or the Q corresponding to the DMRS for the PSCCH is different from the P or the Q corresponding to the DMRS for the PSSCH.

According to embodiments, the first sidelink channel occupies K time domain symbols, K is a positive integer, and the communication unit 910 is further configured to send fourth configuration information to the terminal device, and the fourth configuration information is used for the terminal device to determine a value of the K.

It should be understood that the above and other operations and/or functions of various modules in the network device 900 according to embodiments of the present disclosure are used to implement the corresponding processes of the network device in the method 500 in FIG. 7, and repeated descriptions are omitted here for brevity.

Figure 12:
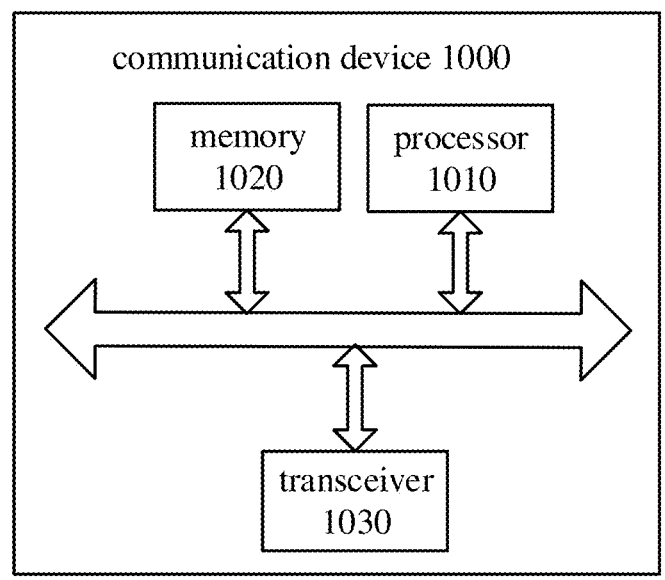
FIG. 12 is a schematic block diagram of a communication device according to an embodiment of the present disclosure.

FIG. 12 is a schematic block diagram of a communication device 1000 according to an embodiment of the present disclosure. The communication device 1000 includes a processor 1010, and the processor 1010 can call and run a computer program from a memory to perform the methods embodiments of the present disclosure.

According to embodiments, as shown in FIG. 12, the communication device 1000 may further include a memory 1020. The processor 1010 may call and run a computer program from the memory 1020 to perform the method embodiments of the present disclosure.

The memory 1020 may be a separate device independent of the processor 1010 or may be integrated in the processor 1010.

According to embodiments, as shown in FIG. 12, the communication device 1000 may further include a transceiver 1030, and the processor 1010 may control the transceiver 1030 to communicate with other devices. Specifically, the transceiver may send information or data to other devices, or receive information or data sent by other devices.

The transceiver 1030 may include a transmitter and a receiver. The transceiver 1030 may further include one or more antennas.

According to embodiments, the communication device 1000 may be a network device in embodiments of the present disclosure, and the communication device 1000 may implement corresponding processes implemented by the network device in each method embodiment of the present disclosure. For brevity, repeated descriptions are omitted here.

According to embodiments, the communication device 1000 may specifically be a mobile terminal/terminal device in embodiments of the present disclosure, and the communication device 1000 may implement the corresponding processes implemented by the mobile terminal/terminal device in each method embodiment of the present disclosure. For the sake of brevity, repeated descriptions are omitted here.

Figure 13:
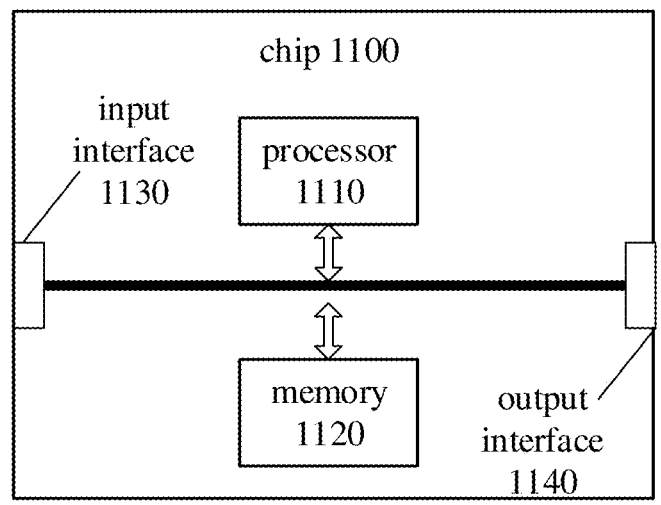
FIG. 13 is a schematic block diagram of a chip according to an embodiment of the present disclosure.

FIG. 13 is a schematic structural diagram of a chip according to an embodiment of the present disclosure. The chip 1100 shown in FIG. 13 includes a processor 1110, and the processor 1110 can call and run a computer program from a memory to perform the method embodiments of the present disclosure.

According to embodiments, as shown in FIG. 13, the chip 1100 may further include a memory 1120. The processor 1110 may call and run a computer program from the memory 1120 to perform the method embodiments of the present disclosure.

The memory 1120 may be a separate device independent of the processor 1110 or may be integrated in the processor 1110.

According to embodiments, the chip 1100 may further include an input interface 1130. The processor 1110 can control the input interface 1130 to communicate with other devices or chips. Specifically, the input interface can obtain information or data sent by other devices or chips.

According to embodiments, the chip 1100 may further include an output interface 1140. The processor 1110 can control the output interface 1140 to communicate with other devices or chips. Specifically, the output interface can output information or data to other devices or chips.

According to embodiments, the chip can be applied to the network device in embodiments of the present disclosure, and the chip can implement the corresponding process implemented by the network device in each method embodiments of the present disclosure. For brevity, repeated descriptions are omitted here.

According to embodiments, the chip can be applied to the mobile terminal/terminal device in embodiments of the present disclosure, and the chip can implement the corresponding process implemented by the mobile terminal/terminal device in each method embodiments of the present disclosure. For brevity, repeated descriptions are omitted here.

It should be understood that the chip mentioned in embodiments of the present disclosure may also be referred to as a system-level chip, a system chip, a chip system, or a system-on-chip, and so on.

Figure 14:
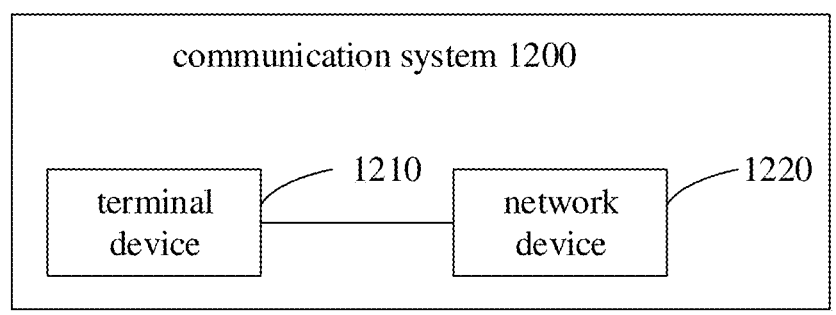
FIG. 14 is a schematic block diagram of a communication system according to an embodiment of the present disclosure.

FIG. 14 is a schematic block diagram of a communication system 1200 according to an embodiment of the present disclosure. As shown in FIG. 14, the communication system 1200 includes a terminal device 1210 and a network device 1220.

The terminal device 1210 can be used to implement the corresponding functions implemented by the terminal device in the foregoing methods, and the network device 1220 can be used to implement the corresponding functions implemented by the network device in the foregoing methods. For brevity, repeated descriptions are omitted here.

It should be understood that the processor in embodiments of the present disclosure may be an integrated circuit chip with signal processing capability. In implementations, the steps of the foregoing method embodiments can be completed by hardware integrated logic circuits in the processor or instructions in the form of software. The above-mentioned processor may be a general-purpose processor, a Digital Signal Processor (DSP), an Application Specific Integrated Circuit (ASIC), a Field Programmable Gate Array (FPGA) or other programmable logic device, discrete gate or transistor logic device, discrete hardware component. The methods, steps, and logical block diagrams disclosed in the embodiments of the present disclosure can be implemented or executed. The general-purpose processor may be a microprocessor or the processor may also be any conventional processor or the like. The steps of the methods disclosed in the embodiments of the present disclosure may be directly embodied as being executed and completed by a hardware decoding processor, or executed by a combination of hardware and software modules in the decoding processor. The software module can be located in a storage medium in the field, such as random access memory, flash memory, read-only memory, programmable read-only memory, or electrically erasable programmable memory, register. The storage medium is located in the memory, and the processor reads the information in the memory to perform the steps of the above methods in combination with hardware.

It can be understood that the memory in the embodiments of the present disclosure may be volatile memory or non-volatile memory, or may include both volatile and non-volatile memory. The non-volatile memory can be Read-Only Memory (ROM), Programmable ROM (PROM), Erasable PROM (EPROM), Electrically EPROM (EEPROM) or flash memory. The volatile memory may be a Random Access Memory (RAM), which is used as an external cache. By way of exemplary rather than limitation, many forms of RAM are available, such as Static RAM (SRAM), Dynamic RAM (DRAM), Synchronous DRAM (SDRAM), Double Data Rate SDRAM (DDR SDRAM), Enhanced SDRAM (ESDRAM), Synchlink DRAM (SLDRAM)), or Direct Rambus RAM (DR RAM). It should be noted that the memory in the systems and methods described in the present disclosure is intended to include but not limited to these and any other suitable types of memory.

It should be understood that the foregoing memory is exemplary but not restrictive. For example, the memory in embodiments of the present disclosure may also be Static RAM (SRAM), Dynamic RAM (DRAM), Synchronous DRAM (SDRAM), Double Data Rate SDRAM (DDR SDRAM), Enhanced SDRAM (ESDRAM), Synchlink DRAM (SLDRAM), or Direct Rambus RAM (DR RAM), and so on. That is to say, the memory in embodiments of the present disclosure is intended to include but not limited to these and any other suitable types of memory.

An embodiment of the present disclosure also provides a computer-readable storage medium for storing computer programs.

According to embodiments, the computer-readable storage medium may be applied to the network device in embodiments of the present disclosure, and the computer programs cause a computer to perform the corresponding processes implemented by the network device in each method embodiment of the present disclosure. For brevity, repeated descriptions are omitted here.

According to embodiments, the computer-readable storage medium may be applied to the mobile terminal/terminal device in embodiments of the present disclosure, and the computer programs cause a computer to perform the corresponding processes implemented by the mobile terminal/terminal device in each method embodiment of the present disclosure. For brevity, repeated descriptions are omitted here.

An embodiment of the present disclosure provides a computer program product, including computer program instructions.

According to embodiments, the computer program product may be applied to the network device in embodiments of the present disclosure, and the computer program instructions cause a computer to perform the corresponding processes implemented by the network device in each method embodiment of the present disclosure. For brevity, repeated descriptions are omitted here.

According to embodiments, the computer program product may be applied to the mobile terminal/terminal device in embodiments of the present disclosure, and the computer program instructions cause a computer to perform the corresponding processes implemented by the mobile terminal/terminal device in each method embodiment of the present disclosure. For brevity, repeated descriptions are omitted here.

An embodiment of the present disclosure also provides a computer program.

According to embodiments, the computer program may be applied to the network device in embodiments of the present disclosure, and when the computer program runs on a computer, the computer is caused to perform the corresponding processes implemented by the network device in each method embodiment of the present disclosure. For brevity, repeated descriptions are omitted here.

According to embodiments, the computer program may be applied to the mobile terminal/terminal device in embodiments of the present disclosure, and when the computer program runs on a computer, the computer is caused to perform the corresponding processes implemented by the terminal device in each method embodiment of the present disclosure. For brevity, repeated descriptions are omitted here.

Those of ordinary skill in the art will appreciate that the exemplary units and algorithm steps described according to embodiments disclosed herein can be carried out by electronic hardware or a combination of electronic hardware and computer software. Whether the functions are implemented by hardware or software depends on particular applications and design constraints of the technical solutions. For each of the particular applications, a person skilled in the art can use different methods to implement the described functions, but such implementation should not be considered as beyond the scope of the present disclosure.

It may be clearly understood by those skilled in the art that details of specific operation procedures of the systems, devices and units can be found in the previous description regarding the method embodiments.

In the embodiments provided in the present disclosure, it should be understood that the disclosed systems, devices and methods may be implemented in other ways. For example, the device embodiments described above are merely illustrative. For example, the division of the units is only a kind of logical function division. In practice, other division manner may be used. For example, multiple units or components may be combined or integrated into another system, or some features may be ignored or not performed. In addition, the illustrated or discussed mutual coupling or direct coupling or communication connection may be indirect coupling or communication connection through some interfaces, devices or units, and may be in electrical, mechanical or other forms.

The units described as separated parts may or may not be physically separated, and the parts displayed as units may or may not be physical units, that is, the units may be located in one place, or may be distributed over multiple network units. Some or all of the units may be selected according to actual needs to achieve the objectives of the solutions in the embodiments.

In addition, the functional units in the embodiments of the present disclosure may be integrated in one processing unit, or the units may exist alone physically, or two or more units may be integrated in one unit.

The functions may also be stored in a computer-readable storage medium if being implemented in the form of a software functional unit and sold or used as an independent product. Based on such understanding, the essence of the technical solutions of the present disclosure, or the part contributing to the prior art or part of the technical solutions, may be embodied in the form of a software product. The computer software product is stored in a storage medium including a number of instructions such that a computer device (which may be a personal computer, a server, or a network device, etc.) performs all or part of steps of the method described in each of the embodiments of the present disclosure. The foregoing storage medium includes: any medium that is capable of storing program codes such as a USB disk, a mobile hard disk, a Read-Only Memory (ROM), a Random Access Memory (RAM), a magnetic disk or an optical disk, and the like.

The foregoing descriptions are merely exemplary embodiments of the present disclosure, but the protection scope of the present disclosure is not limited thereto. Any person skilled in the art can easily think of changes or substitutions within the technical scope of the present disclosure, and all the changes or substitutions should be covered by the protection scope of the present disclosure. Therefore, the protection scope of the present disclosure should be defined by the appended claims.

What is claimed is:

1. A method for sidelink channel configuration, comprising:
   receiving, in a terminal device, first configuration information sent from a network device by control channel signaling, wherein the first configuration information is used to indicate that a second time domain symbol in a first sidelink channel is a first Demodulation Reference Signal (DMRS) time domain symbol; and
   determining, in the terminal device, that the second time domain symbol in the first sidelink channel is the first DMRS time domain symbol, and a difference in symbol locations of two adjacent DMRS time domain symbols is N, wherein the first sidelink channel occupies K time domain symbols, and a value of K is a positive integer, $1 \leq N < K$;
   wherein the method further comprises:
   receiving, in the terminal device, further configuration information sent from the network device, wherein the further configuration information is used to indicate first index information; and determining, in the terminal device, a first DMRS pattern according to the first index information and a first correspondence, wherein the first correspondence comprises a correspondence between index information and DMRS patterns, and the first DMRS pattern is the DMRS pattern for transmitting the first sidelink channel, and wherein the first correspondence is pre-configured to the terminal device.

2. The method according to claim 1, wherein determining, in the terminal device, that the second time domain symbol in the first sidelink channel is the first DMRS time domain symbol comprises:
   according to pre-configuration information, determining, in the terminal device, that the second time domain symbol in the first sidelink channel is the first DMRS time domain symbol.

3. The method according to claim 1, wherein the N is pre-configured to the terminal device, or the N is configured to the terminal device by a network device.

4. The method according to claim 1, further comprising:
   receiving, in the terminal device, third configuration information for configuring a resource pool sent from a network device, wherein the third configuration information is further used to indicate a DMRS pattern for the first sidelink channel transmitted in the resource pool.

5. The method according to claim 1, further comprising:
   determining, in the terminal device, that a difference in subcarrier locations of two adjacent DMRS signals in any Physical Resource Block (PRB) on each DMRS time domain symbol is M, where $M \geq 1$.

6. The method according to claim 5, wherein the Mis pre-configured to the terminal device, or the Mis configured by a network device to the terminal device.

7. The method according to claim 1, wherein the first sidelink channel is any one of a Physical Sidelink Control Channel (PSCCH), a Physical Sidelink Shared Channel (PSSCH), a feedback channel, and a Physical Sidelink Broadcast Channel (PSBCH).

8. The method according to claim 7, wherein a DMRS pattern for the PSSCH is indicated by the PSCCH corresponding to the PSSCH, or the N corresponding to DMRS for the PSSCH is indicated by the PSCCH corresponding to the PSSCH.

9. The method according to claim 7, wherein the PSCCH and the PSSCH have different DMRS patterns.

10. The method according to claim 1, wherein the first sidelink channel occupies at least one subframe or slot.

11. A terminal device, comprising a processor and a memory, wherein the memory is configured to store a computer program, and the processor is configured to call and run the computer program stored in the memory to cause the terminal device to:

receive first configuration information sent from a network device by control channel signaling, wherein the first configuration information is used to indicate that a second time domain symbol in a first sidelink channel is a first Demodulation Reference Signal (DMRS) time domain symbol; and determine that the second time domain symbol in the first sidelink channel is the first DMRS time domain symbol, and a difference in symbol locations of two adjacent DMRS time domain symbols is N, wherein the first sidelink channel occupies K time domain symbols, and a value of K is a positive integer, where 1≤N<K;

receive further configuration information sent from the network device, wherein the further configuration information is used to indicate first index information; and determine a first DMRS pattern according to the first index information and a first correspondence, wherein the first correspondence comprises a correspondence between index information and DMRS patterns, and the first DMRS pattern is the DMRS pattern for transmitting the first sidelink channel, and wherein the first correspondence is pre-configured to the terminal device.

12. The terminal device according to claim 11, wherein the processor is configured to call and run the computer program stored in the memory to cause the terminal device to:

according to pre-configuration information, determine that the second time domain symbol in the first sidelink channel that occupies the K time domain symbols is the first DMRS time domain symbol.

13. The terminal device according to claim 11, wherein the N is pre-configured to the terminal device, or the N is configured to the terminal device by a network device.

14. The terminal device according to claim 11, further comprising:

a transceiver,
wherein the processor is configured to control the transceiver to receive third configuration information for configuring a resource pool sent from a network device, and
wherein the third configuration information is further used to indicate a DMRS pattern for the first sidelink channel transmitted in the resource pool.

\* \* \* \* \*